United States Patent
Kim et al.

(10) Patent No.: US 8,791,397 B2
(45) Date of Patent: Jul. 29, 2014

(54) INDUCTION HEATING DEVICE FOR FUEL CELL SYSTEM

(75) Inventors: Seong Kyun Kim, Seoul (KR); Haeng Jin Ko, Seoul (KR); Su Dong Han, Gyeonggi-do (KR); Gi Young Nam, Gyeonggi-do (KR); Yun Seok Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 276 days.

(21) Appl. No.: 13/170,401

(22) Filed: Jun. 28, 2011

(65) Prior Publication Data

US 2012/0118878 A1    May 17, 2012

(30) Foreign Application Priority Data

Nov. 12, 2010   (KR) .................. 10-2010-0112577

(51) Int. Cl.
*B60L 1/02* (2006.01)
*H05B 6/02* (2006.01)
*H05B 6/06* (2006.01)

(52) U.S. Cl.
USPC .......................... 219/600; 219/208; 219/650

(58) Field of Classification Search
USPC ......... 219/660, 202–208, 635, 643, 650, 600; 429/410–435, 437
See application file for complete search history.

(56) References Cited

U.S. PATENT DOCUMENTS

| | | | |
|---|---|---|---|
| 6,177,660 B1 * | 1/2001 | Usui et al. ............... | 219/631 |
| 6,448,535 B1 * | 9/2002 | Ap ........................... | 219/208 |
| 7,749,632 B2 * | 7/2010 | Zhang et al. ........... | 429/438 |
| 7,759,010 B2 | 7/2010 | Hoch | |
| 8,281,813 B2 * | 10/2012 | Na .......................... | 137/625.48 |
| 2009/0118126 A1 * | 5/2009 | Burke et al. ............ | 505/211 |
| 2009/0321532 A1 * | 12/2009 | Maitre .................... | 236/91 R |

FOREIGN PATENT DOCUMENTS

| | | |
|---|---|---|
| JP | 2006134644 A | 5/2006 |
| JP | 2009185676 A | 8/2009 |
| KR | 10-1999-0015929 | 3/1999 |
| KR | 10-0841930 | 6/2008 |

* cited by examiner

*Primary Examiner* — Tu B Hoang
*Assistant Examiner* — Michael Laflame, Jr.
(74) *Attorney, Agent, or Firm* — Edwards Wildman Palmer LLP; Peter F. Corless

(57) ABSTRACT

The present invention provides an induction heating device for a fuel cell system, which can rapidly heat coolant during cold start-up, control the power consumption depending on the voltage of a fuel cell stack, and ensure the insulation resistance by separating a heating unit, which is in contact with the coolant, from the outside. That is, the present invention provides an induction heating device for a fuel cell system, in which an insulating housing is provided in a coolant circulation line, a heater for heating coolant is provided in the housing, and a high frequency controller for controlling the power consumption of the heater is provided at the outside of the housing such that the coolant can be rapidly heated during cold start-up, precisely control the power consumption depending of the voltage of a fuel cell stack, and improve the insulation performance by separating the heater as a heating unit, which is in contact with the coolant, and the high frequency controller and a coil as a power unit with respect to the insulating housing.

8 Claims, 5 Drawing Sheets

INDUCTION HEATING DEVICE FOR FUEL CELL SYSTEM

CROSS-REFERENCE TO RELATED APPLICATION

This application claims under 35 U.S.C. §119(a) the benefit of Korean Patent Application No. 10-2010-0112577 filed Nov. 12, 2010, the entire contents of which are incorporated herein by reference.

BACKGROUND (a) Technical Field

The present invention relates to an induction heating device for a fuel cell system. More particularly, it relates to an induction heating device for a fuel cell system, which can to rapidly heat coolant during cold start-up, control the power consumption depending on the voltage of a fuel cell stack, and ensure the insulation resistance by separating a heating unit, which is in contact with the coolant, from the outside.

(b) Background Art

A conventional fuel cell system comprises a fuel cell stack for generating electricity and heat in the form of reaction products via an electrochemical reaction. In a fuel cell system, the chemical energy of a fuel is converted into electrically energy. Typically, fuel cell systems include, for example, a hydrogen supply system for supplying hydrogen as fuel to the fuel cell stack, an oxygen (air) supply system for supplying oxygen-containing air as an oxidant required for the electrochemical reaction in the fuel cell stack, and a thermal management system (TMS) for removing reaction heat from the fuel cell stack to the outside of the fuel cell system, controlling operation temperature of the fuel cell stack, and performing water management function.

A fuel cell stack is consists of a plurality of unit cells. Each of these unit cells have an anode, a cathode and an electrolyte (electrolyte membrane). Hydrogen is supplied to the anode ("fuel electrode") and oxygen-containing air is supplied to the cathode ("air electrode" or "oxygen electrode").

The hydrogen supplied to the anode is dissociated into hydrogen ions (protons, $H^+$) and electrons ($e^-$) by a catalyst disposed in an electrode/catalyst layer. The hydrogen ions and electrons are transmitted to the cathode through the electrolyte membrane and a separator, to respectively. At the cathode, the hydrogen ions and electrons transmitted from the anode react with the oxygen-containing air supplied to the cathode to produce water. Electrical energy generated by the flow of the electrons is supplied to a load (e.g., a motor for driving a fuel cell vehicle) requiring the electrical energy through a current collector of an end plate.

The role of the thermal management system for the fuel cell system is particularly important in order to prevent the temperature of the fuel cell stack from increasing during operation of the fuel cell system and improve cold startability.

The conventional configuration of a thermal management system will be described with reference to FIG. 4 below. In FIG. 4, a water pump 16 is provided in a coolant circulation line 14, which is connected between a coolant outlet of a fuel cell stack 10 and an inlet of a radiator 18. The conventional thermal management system also has a coolant heating device 20 and a reservoir which are sequentially connected in the coolant circulation line 14.

Here, the coolant circulating through the coolant circulation line 14 functions as a cooling medium that cools the fuel cell stack 10 during operation and functions as a heating medium that is rapidly heated by the coolant heating device 20 and supplied to the fuel cell stack 10 to rapidly thaw the fuel cell stack 10 during cold start-up.

In conventional designs, the coolant heating device 20 includes a heater for heating the coolant. The heater is used to increase the temperature of the coolant, achieve more rapid temperature stabilization of the coolant during start-up of the vehicle, and reduce the to remaining voltage of the fuel cell stack during shutdown of the vehicle.

In FIG. 4, the conventional coolant heating device 20 has a structure, in which cartridge resistance heaters 24 are connected to a power unit provided in a housing 22, through which the coolant passes. However, this structure has the following disadvantages. First, there should be a predetermined distance between each of the heaters 24, which are high density heating elements. Thus, the volume of the housing 22 is significantly increased in conventional designs. Therefore, it is difficult to ensure a space for mounting the heating device which has such a large volume in a compact vehicle such as a fuel cell vehicle. Moreover, the complicated structure increases the manufacturing cost and reduces the assemblability and maintainability of this system. Furthermore, the cartridge resistance heaters are in direct contact with the coolant, and thus it is necessary to ensure the cartridge resistance heaters are insulated accordingly.

In addition, the cartridge resistance heaters penetrating the housing are typically sealed with O-rings, and thus when the temperature of the heaters is increased, the coolant may leak due to deformation of the O-rings, thus destroying the insulation.

FIG. 5 is a schematic diagram showing a conventional cold start-up system for a fuel cell. Referring to FIG. 5, a plurality of resistors R1, R2 and R3 and a plurality of switches L1, L2 and L3 are connected to a fuel cell stack 10 such that the resistance values are controlled step by step using the resistors R1, R2 and R3. As a result, it is possible to prevent the voltage of the fuel cell stack from dropping below a lower limit, thus enabling the cold start-up.

In detail, the plurality of resistors R1, R2 and R3 having different resistance values are connected in parallel to both ends of the fuel cell stack 10, and the plurality of switches L1, L2 and L3 for switching the circuit are connected to the resistors R1, R2 and R3, respectively, to change the resistance values applied to the both ends of the fuel cell stack 10 by on/off control of the switches L1, L2 and L3 such that the voltage of the fuel cell stack 10 is controlled between a predetermined lower limit for achieving cold start-up and an upper limit during cold start-up.

However, to control the power of the fuel cell stack during cold start-up, this system requires a heater at each resistor and a relay for controlling the heater, which imposes various limitations to the overall system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an induction heating device for a fuel cell system, in which an insulating housing is provided in a coolant circulation line, a heater for heating coolant is provided in the housing, and a high frequency controller for controlling the power consumption of the heater is provided at the outside of the housing such that the coolant can be rapidly heated during cold start-up, allow for precise control the power consumption to depending of the voltage of a fuel cell stack, and improve the insulation performance by separating the heater as a heating unit, which is in contact with the coolant. More specifically, the high frequency controller and a coil are configured as a power unit with respect to the insulating housing.

In one aspect, the present invention provides an induction heating device for a fuel cell system which has a coolant circulation line of a thermal management system. This induction heating device includes an insulating housing which is provided in the coolant circulation line; an induction coil mounted on the outer surface of the housing and configured to generate an induced current; a high frequency controller which is provided at the outside of the induction coil and configured to generate high frequencies based on the magnitude of the voltage output from a fuel cell stack; a heater disposed to be in direct contact with the coolant in the housing and configured to generate heat via the induced current; and a connector which is connected to the high frequency controller to supply power.

In some embodiments, the induction coil may be covered by an electromagnetic wave shielding member and the induction heating device may also have a temperature sensor, which measures the temperature of the coolant and transmits a corresponding signal to the high frequency controller. This temperature sensor may be mounted at an outlet of the coolant circulation line accordingly.

In still another embodiment, the heater may formed of a metal material capable of transferring heat and have a cylindrical shape and a honeycomb cross-sectional structure.

In yet another embodiment, the induction heating device may further include a diaphragm integrally formed on the inner surface of the coolant circulation line to be inserted toward the center of the heater. This diaphragm may be provided when the housing is mounted in a direction perpendicular to the coolant circulation line.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
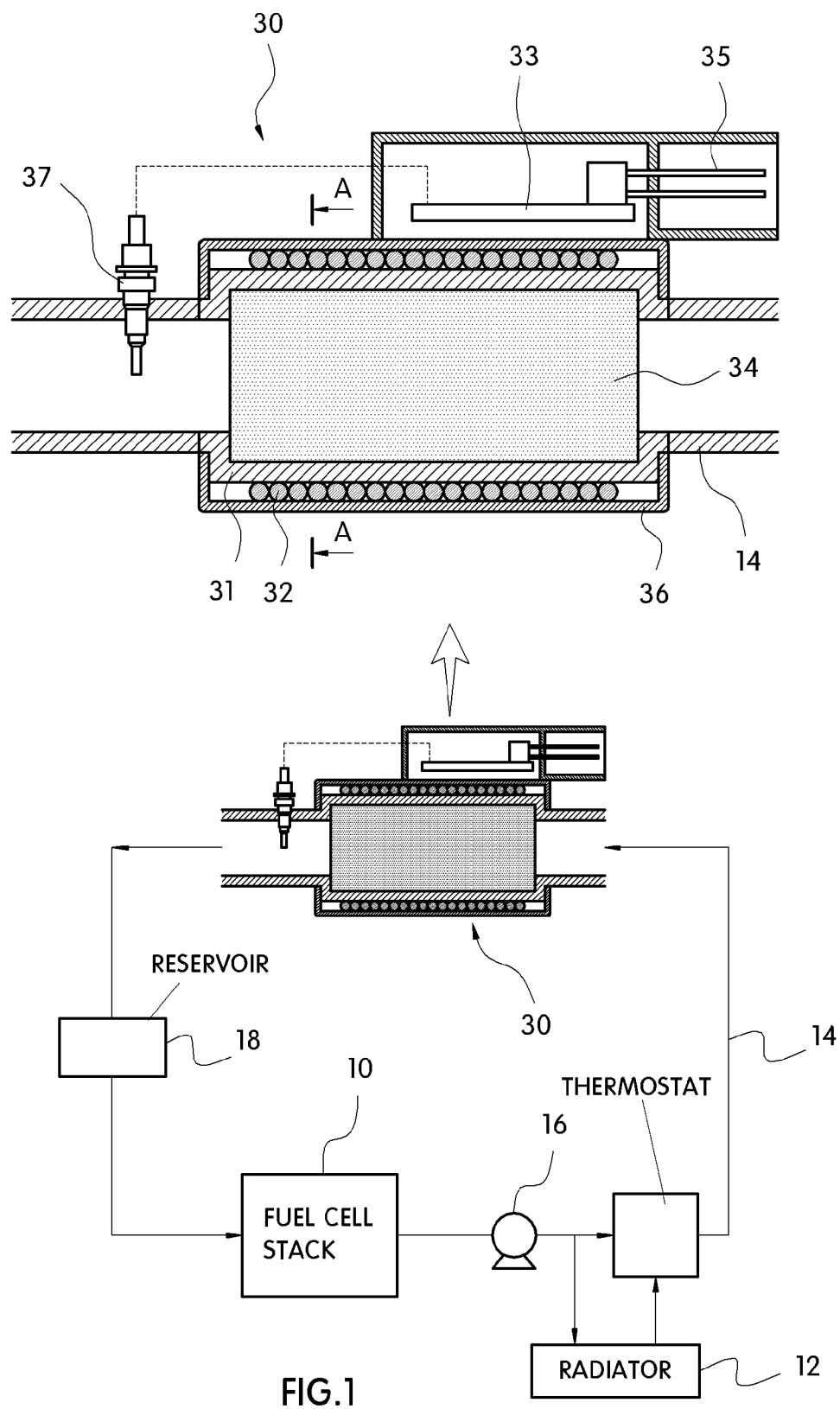
FIG. 1 is a schematic diagram showing a thermal management system comprising an induction heating device for a fuel cell system in accordance with an exemplary embodiment of the present invention.

Reference numerals set forth in the Drawings includes reference to the following elements as further discussed below:

10: fuel cell stack
12: radiator
14: coolant circulation line
16: water pump
18: reservoir
20: coolant heating device
22: housing
24: cartridge resistance heater
30: induction heating device
31: housing
32: induction coil
33: high frequency controller
34: heater
35: connector
36: electromagnetic wave shielding member
37: temperature sensor
38: diaphragm It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, to electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As mentioned above, the coolant circulating through a coolant circulation line of a thermal management system for a fuel cell system functions as a cooling medium that cools a fuel cell stack during operation and functions as a heating medium that is rapidly heated by a coolant heating device to quickly thaw the fuel cell stack during cold start-up.

In doing so, the present invention provides an induction heating device for a fuel cell system. The induction heating device is provided in a coolant circulation line of a thermal management system. Advantageously, the induction heating device of the present invention can rapidly heat the coolant to improve cold start-up, allow for precise control the power consumption depending on the voltage of a fuel cell stack, and ensure the insulation between a power unit and a heating unit.

Figure 3:
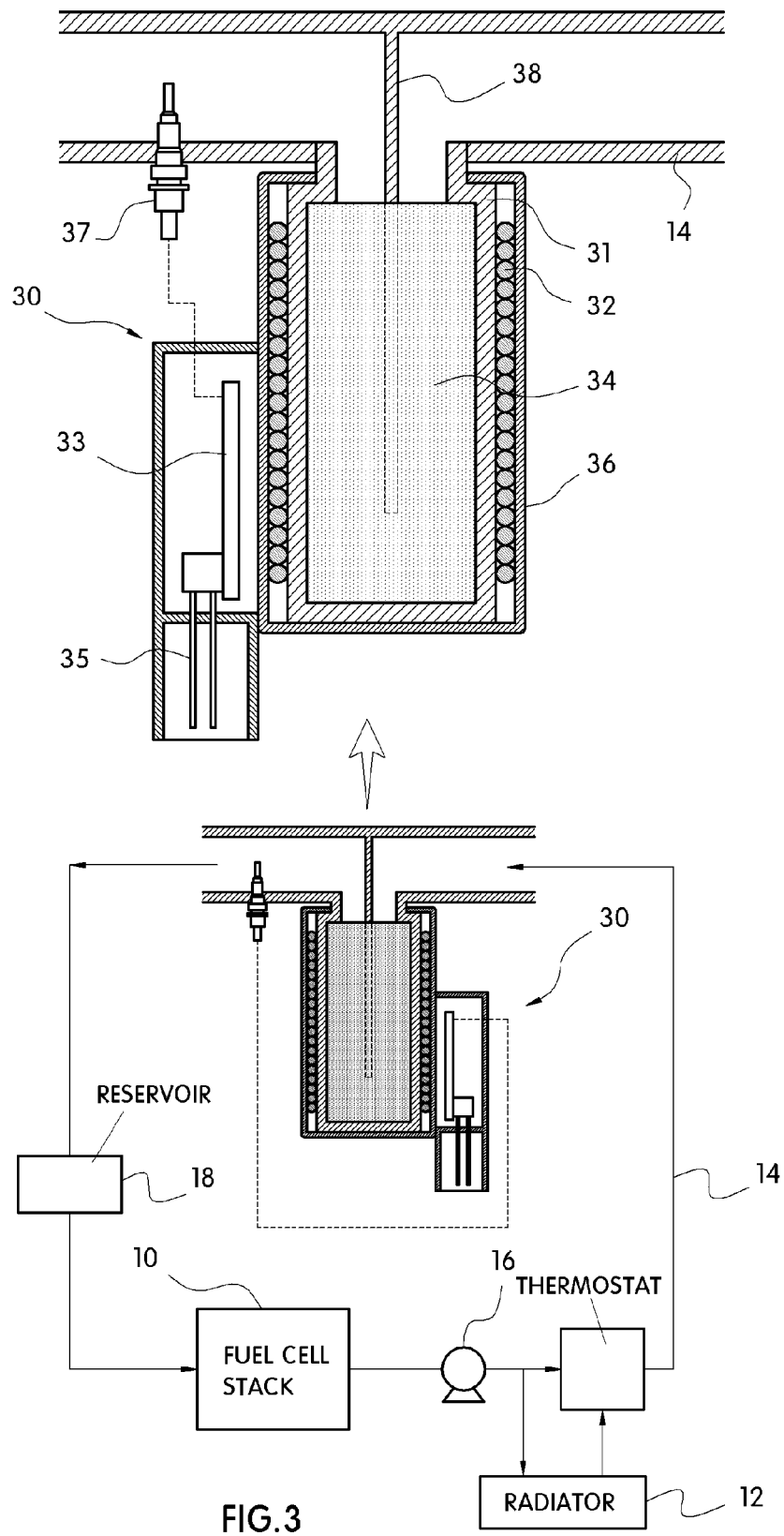
FIG. 3 is a cross-sectional view taken along line A-A of FIG. 1.
Figure 4:
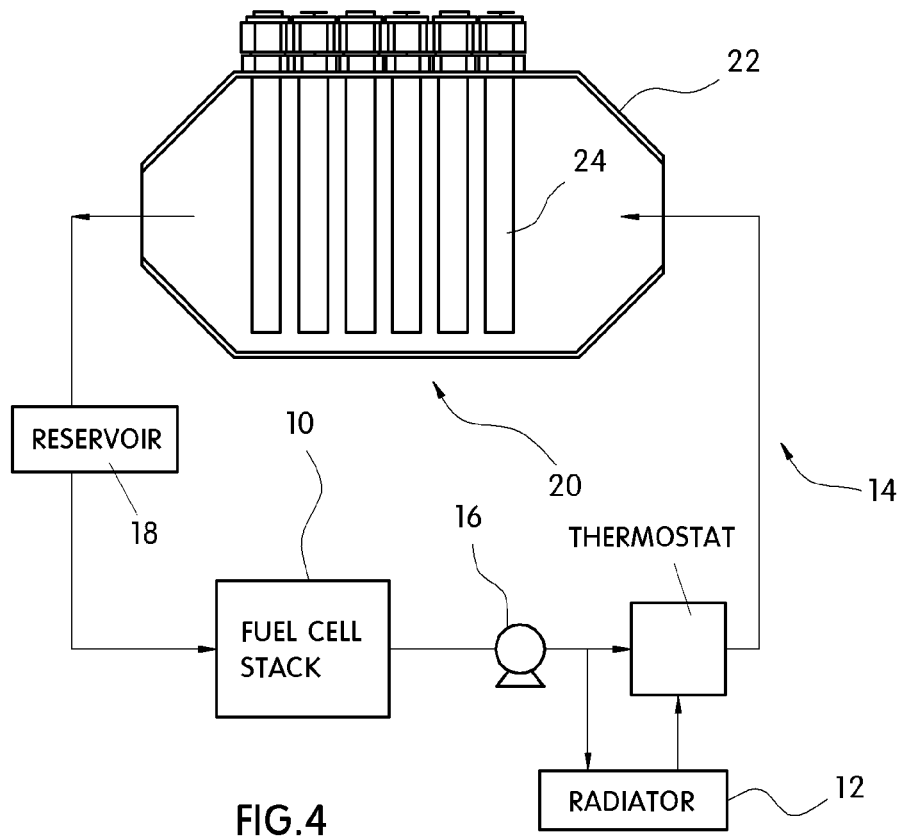
FIG. 4 is a schematic diagram showing a conventional heating device for a fuel cell system.
Figure 5:
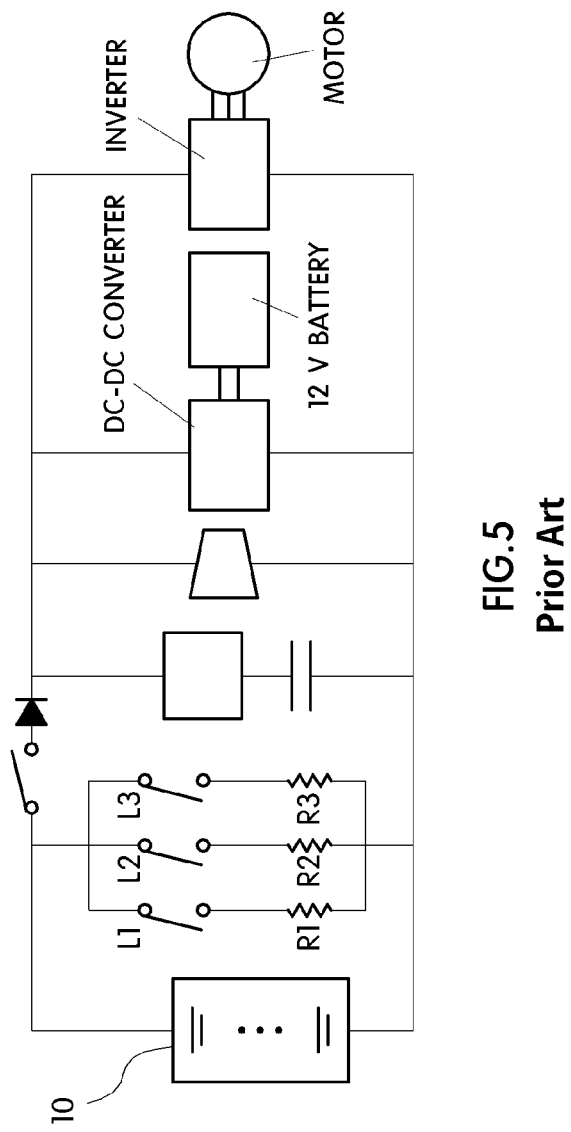
FIG. 5 is a schematic diagram showing a conventional cold start-up system for a fuel cell.

As shown in FIGS. 1 and 3, the induction heating device 30 comprises a housing 31 formed of an insulating material such as plastic and includes a coolant flow path. The housing 31 is provided in the coolant circulation line of the thermal management system. An inlet of the housing 31 is fluidly connected to an outlet of a radiator 12, and an outlet of the housing 31 is fluidly connected to a coolant inlet of a fuel cell stack 10.

A heater 34, which is disposed to be in direct contact with the coolant to heat the coolant, is provided inside the housing 31, i.e., directly in the coolant flow path. The heater 34 may be a heating unit formed of a metal material and configured to heat by an induced current. As shown in FIG. 3, the heater 34 is in close contact with an inner circumference of the coolant flow path of the housing 31 to increase the contact area with the coolant. Therefore, the heater 34 may be configured to have a cylindrical shape and a honeycomb cross-sectional structure increase the rate of heat transfer from the electric heater to the coolant.

In FIG. 3, an induction coil 32 for generating an induced current is wound on the outer surface of the housing 31, and an electromagnetic wave shielding member 36 is provided on the induction coil 32, to thereby prevent electromagnetic waves, generated from the induction coil 32, from leaking to the outside.

The system of FIG. 3 also includes, a high frequency controller 33, which generates high frequencies based on the magnitude of the voltage output from the fuel cell stack 10. This high frequency controller 33 is disposed at the outside of the induction coil 32, e.g., at the outside of the electromagnetic wave shielding member 36. In addition, a connector 35 for supplying the power of the fuel cell stack 10 is connected to the high frequency controller 33.

A temperature sensor 37 measures the temperature of the coolant and transmits a corresponding signal to the high frequency controller 33. This temperature may be mounted at an outlet of the coolant circulation line 14. Therefore, the high frequency controller 33 controls the frequency based on the temperature of coolant or heater measured by the temperature sensor 37 to prevent the coolant from overheating.

Figure 2:
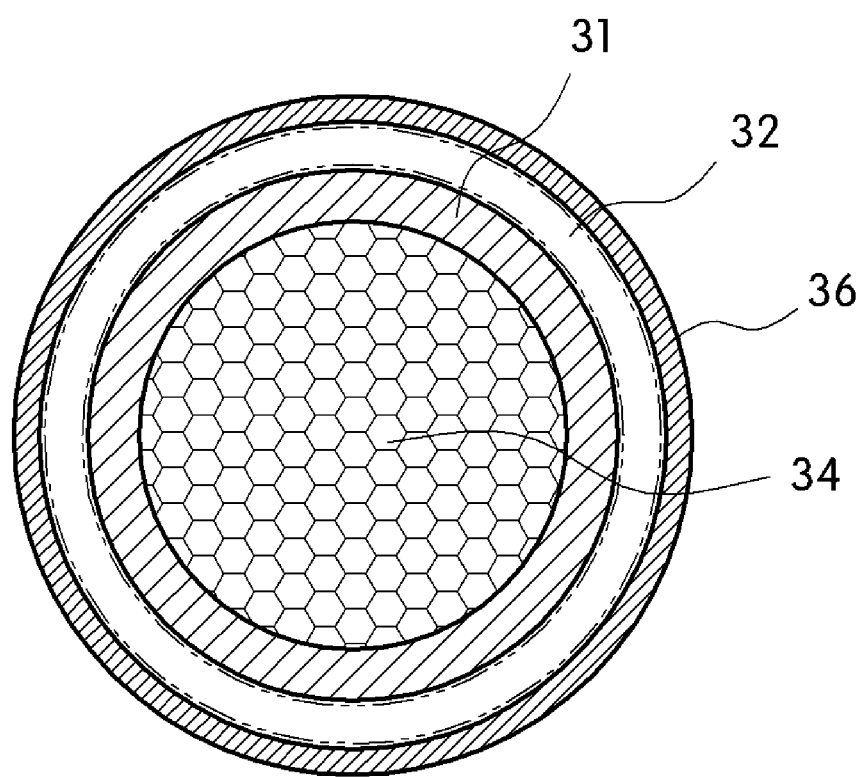
FIG. 2 is a schematic diagram showing a thermal management system comprising an induction heating device for a fuel cell system in accordance with another exemplary embodiment of the present invention.

As shown in FIG. 2, when the housing 31 is mounted in a direction perpendicular to the coolant circulation line 14, a diaphragm 38 extending in the vertical direction may be integrally formed on the inner surface of the coolant circulation line 14. The diaphragm 38 in this case is inserted toward the center of the heater 34 in the housing 31 to divide the coolant flow path into two parts.

In accordance with the present invention, the induction heating device may be operated as follows:

During cold start-up of the fuel cell system, a water pump 16 may operate to circulate the coolant from the fuel cell stack 10 to the radiator 12, and the coolant discharged from the radiator 12 flows into the housing 31 of the induction heating device 30 for heating the coolant.

Here, the high frequency controller 33 receiving the power from the fuel cell stack 10 or battery through the connector 35 generates high frequencies and applies a high frequency current to the induction coil 32. Then, the induction coil 32 generates an induced current, and the heater 34 receiving the induced current from the induction coil 32 generates heat.

That is, since the induction coil 32 is close to the heater 34 with the housing 31 interposed therebetween, an eddy current is generated in the heater 34 (e.g., formed of a metal material) to cause an eddy current loss or hysteresis loss, and thus the heater 34 generates heat.

Therefore, the heater 34, receiving the induced current from the induction coil 32, to generates heat such that the coolant flowing into the housing 31 is heated, and thus the temperature of the coolant is rapidly increased.

Then, the coolant heated by the heater 34 is supplied to the fuel cell stack 10 to rapidly thaw the fuel cell stack 10, and thus the fuel cell stack 10 enters its normal operation state within a shortened period of time.

In some embodiments, during cold start-up, it may be necessary to consume the power of the fuel cell stack. At this time, the voltage of the fuel cell stack 10 between a lower limit for achieving cold start-up and an upper limit during cold start-up may be controlled by the high frequency controller 33.

That is, since the power consumption of the heater 34 is determined by the frequency control of the high frequency controller 33, the power consumption can be kept within the voltage of the fuel cell stack 10 between a lower limit and an upper limit by the high frequency controller 33. Moreover, since the power consumption can be controlled based on the voltage of the fuel cell stack 10, it is possible to prevent the occurrence of a reverse voltage.

As mentioned above, when the housing 31 is mounted in a direction perpendicular to the coolant circulation line 14, the diaphragm 38 inserted toward the center of the heater 34 in the housing 31 to divide the coolant flow path into two parts is formed on the inner surface of the coolant circulation line 14. Therefore, the flow length of the coolant is increased by the diaphragm 38, and thus the contact time between the coolant and the heater is increased to more efficiently heat the coolant.

Advantageously, the insulating housing is provided in the coolant circulation line of the fuel cell system, the heater is provided in the housing, and the high frequency controller and the coil as a power unit are provided at the outside of the housing such that the power consumption of the heater may be controlled by the frequency control of the high frequency controller, thus allowing the present invention to precisely control the power consumption. Moreover, the power consumption can be controlled based on the voltage of the fuel cell stack, and thus it possible to prevent a reverse voltage.

Furthermore, the present invention makes it possible to rapidly heat the coolant using the heater by the high frequency control, and thus it is possible to improve the cold start-up of the fuel cell system.

In addition, since the heater is in direct contact with the coolant in the housing and the high frequency controller is provided at the outside of the housing, it is possible to prevent the coolant from leaking, thus ensuring electrical insulation between the power unit and the heating unit.

Additionally, in those embodiments in which the heater has a honeycomb cross-sectional structure, it is possible to increase the heating surface area of the heater and the heat transfer efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An induction heating device for a fuel cell system including a coolant circulation line of a thermal management system, the induction heating device comprising:
    an insulating housing provided in the coolant circulation line;
    an induction coil mounted on an outer surface of the insulating housing and generating an induced current;
    a frequency controller that controls a current frequency based on a magnitude of a voltage output from a fuel cell stack to apply controlled frequency current to the induction coil;

a heater disposed to be in direct contact with coolant in the housing and that generates heat due to the induced current;

a connector connected to the frequency controller to supply power from the fuel cell stack to the frequency controller; and a diaphragm integrally formed on the inner surface of the coolant circulation line to be inserted toward the center of the heater, the diaphragm being provided when the housing is mounted in a direction perpendicular to the coolant circulation line.

2. The induction heating device of claim 1, wherein the induction coil is covered by an electromagnetic wave shielding member.

3. The induction heating device of claim 1, further comprising a temperature sensor, which measures the temperature of the coolant and transmits a corresponding signal to the frequency controller, the temperature sensor being mounted at an outlet of the coolant circulation line, wherein the frequency controller further controls the current frequency based on the temperature of the coolant or heater measured by the temperature sensor.

4. The induction heating device of claim 1, wherein the heater is formed of a metal material capable of transferring heat and has a cylindrical shape and a honeycomb cross-sectional structure.

5. An induction heating device connected to a coolant line of a thermal management system of a fuel cell vehicle comprising a housing disposed within the coolant line;

a coil mounted on an outer surface of the housing, the coil configured to generate an induced current;

a controller configured to control a current frequency based on a magnitude of a voltage output from a fuel cell stack to apply controlled frequency current to the induction coil;

a heater disposed in direct contact with coolant traveling through the housing and the heater configured to generate heat by using the induced current;

a connector connected to the controller to supply power from the fuel cell stack; and a diaphragm integrally formed on an inner surface of the coolant line to be inserted toward the center of the heater, the diaphragm being provided when the housing mounted in a direction perpendicular to the coolant line.

6. The induction heating device of claim 5, wherein the coil is an induction coil and is covered by an electromagnetic wave shielding member.

7. The induction heating device of claim 5, further comprising a temperature sensor, which measures the temperature of the coolant and transmits a corresponding signal to the controller, the temperature sensor mounted at an outlet of the coolant line, wherein the frequency controller further controls the current frequency based on the temperature of the coolant or heater measured by the temperature sensor.

8. The induction heating device of claim 5, wherein the heater is formed of a metal material capable of transferring heat and has a cylindrical shape, wherein the fluid flows through a honeycomb cross-sectional structure of the heater.

* * * * *